Nov. 29, 1949  C. W. CHESTER  2,489,480
EXHAUST PIPE EXTENSION
Filed March 23, 1945  2 Sheets-Sheet 1

Inventor
Carroll W. Chester

Nov. 29, 1949     C. W. CHESTER     2,489,480
EXHAUST PIPE EXTENSION

Filed March 23, 1945     2 Sheets-Sheet 2

Inventor
Carroll W. Chester
Attys.

Patented Nov. 29, 1949

2,489,480

UNITED STATES PATENT OFFICE 2,489,480

EXHAUST PIPE EXTENSION

Carroll W. Chester, Los Angeles, Calif.

Application March 23, 1945, Serial No. 584,309

15 Claims. (Cl. 138—46.5)

This invention relates to extensions for exhaust pipes, or tail pipes, of automobiles; and the general purpose of the invention is to provide a simple and effective extension which will continue the exhaust pipe rearwardly past the rear bumper or other rearmost structure of an automobile, and at the same time be proof against damage to itself and also protect the exhaust pipe from damage.

In most if not all automobiles the exhaust pipe extends rearwardly to a point somewhat forward of the rear bumper, or of the rearmost part of the automobile structure. It is desirable to extend the pipe rearwardly as far as possible, so as to eject the exhaust fumes as far rearward as may be; but at the same time the exhaust pipe cannot or should not extend rearwardly beyond the rearmost structure, which is usually the rear bumper, so that the pipe is protected by the bumper against injury. And it is very important to protect the exhaust pipe against injury, because any breaks allowing leakage at any point in the exhaust conduit beneath the automobile are extremely dangerous; and if the exhaust pipe is injured in such manner as to cause stoppage or constriction, that also is extremely dangerous.

It is desirable to effectively extend the exhaust conduit as far rearwardly as is possible or practicable, not only for the ejection of the exhaust fumes as far as practicable behind the automobile, to minimize the chance of exhaust gas seepage into the car; but also to protect the finish of the car structure from the deterioration which is caused by the constant exposure of the finish to exhaust fumes.

My invention provides an extension for the exhaust pipe which effectively extends the exhaust conduit to a point well behind the rearmost part of the automobile structure; and it provides an extension structure which is proof against damage to itself, and which protects the exhaust pipe proper from damage, in case the extension is contacted or struck either in a longitudinal direction or in a transverse direction. The nature of the invention will be best understood from a following detailed description of preferred forms of extension embodying the invention, and which are illustrated in the accompanying drawings in which:

Figure 1:
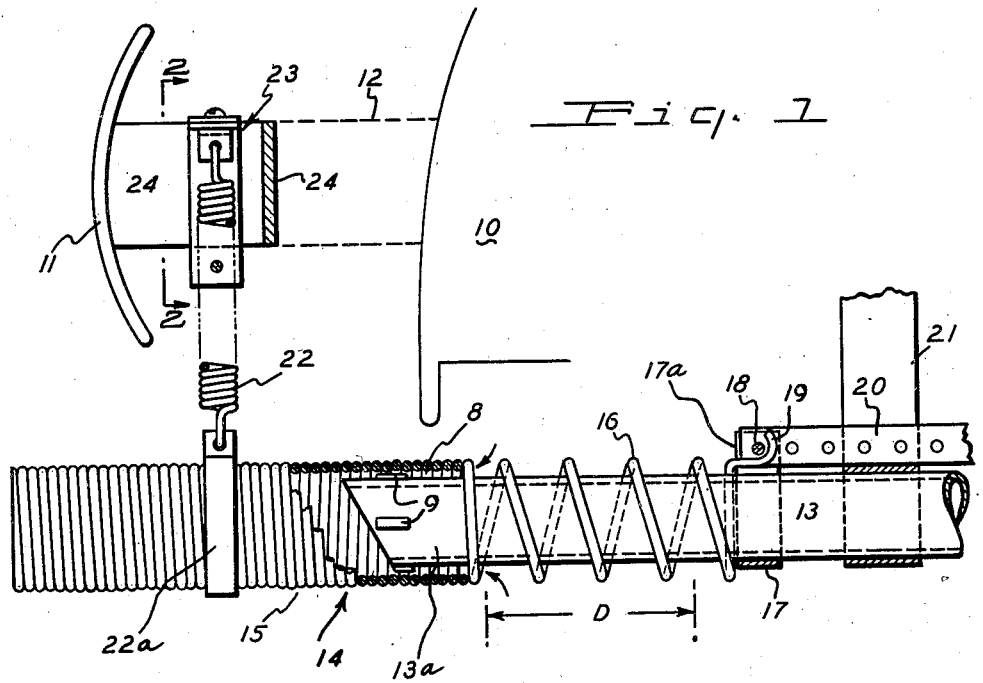
Fig. 1 is a diagrammatic side elevation, with parts in section, showing the rear end of an automobile with one form of my invention applied thereto.

The several modifications shown in the drawings are intended merely to be typical of my invention.

In the drawings Fig. 1 diagrammatically shows the rear portion of an automobile body structure 10, and shows a rear bumper 11, mounted on frame extensions 12, as the rearmost part of the body or frame structure of the automobile. The exhaust pipe 13 is shown as extending to a point somewhat forward of rear bumper 11; and my exhaust pipe extension, generally designated by the numeral 14, in Fig. 1, is shown as extending the exhaust conduit to a point well to the rear of bumper 11.

Fig. 1 shows one preferred and simple form of the extension. In this view the exhaust pipe proper is shown at 13. The simple form of conduit extension, as there shown, consists of a length of tightly coiled helical spring 15 with its forward portion sliding fitted over the rear end portion 13a of exhaust pipe 13. In this tightly coiled section the convolutions are pre-compressed—they are yieldingly pressed against each other. Preferably the coiled spring does not fit the exhaust pipe closely, but on the contrary rather loosely or at least slidingly; and, if the fit is loose, a series of spaced lugs 9 may, if desired, be provided on the pipe to space the spring concentrically around the pipe. This leaves an annular passage at 8 through which air will be drawn, to cool the spring and preserve its temper. Forward of the forward end of the tightly coiled portion 15 the wire or rod of the helical spring is coiled openly, and preferably widely openly, to form an open coil section 16 of the spring. This forward openly-coiled section also fits the exhaust pipe slidingly. And the forward end of the openly coiled section of the spring is rigidly attached to exhaust pipe 13 by any suitable means, as by the clamp indicated at 17. This clamp may be of any suitable form; I indicate a simple one having ears 17a drawn together by a bolt 18, clamping the curved end 19 of spring 16 between the ears. The clamp may be adjustably fixed in longitudinal position on the exhaust pipe by a metal strap 20 which may be attached in any suitable manner to any convenient fixed element on the automobile, for instance to a bracket 21 which supports the exhaust pipe.

The size and elastic stiffness of the wire or rod forming the spring is such that the open section 16 can be relatively easily compressed if a longitudinal force is applied to the rear end of closely coiled section 15. Application of such a force (for instance by another automobile moving up behind the exhaust pipe extension, or by the extension equipped car backing in to some obstruction) will move the rear section 15 bodily forwardly, sliding it forward on the exhaust pipe and compressing the open section 16. The open section 16 can be compressed, and rear section 15 can move forward, through a distance, such as indicated by the dimension D, which is equal to the total compressibility of the openly coiled section 16. And in applying my extension to an automobile, the parts are so arranged and mounted that, in the normal position of the extension, it will project behind the rearmost frame structure (bumper 11) by a distance which is not greater than the compressibility distance D. Consequently, whenever longitudinal force is applied to the extension, it slides forwardly on the exhaust pipe until bumper 11 contacts with the object which is pushing the extension forward.

When the extension is struck laterally, or when for any reason any lateral force is applied to the extension, the closely coiled section 15 temporarily deflects laterally. It does this by virtue of the coiled spring formation opening up along one side, in the manner which is well known.

The elastic stiffness of the closely coiled spring, and the contact pressure between its several convolutions, may be such that the spring will effectively support itself without deflection of its part which extends beyond the end of the exhaust pipe. But at the same time the elastic stiffness of that part of the spring is such that the rear end may be readily deflected laterally without imposing any great lateral thrust to the end of the exhaust pipe. For the purpose of giving the exhaust pipe good support against the lateral stress which may be thus applied to it, it is preferred to give the exhaust pipe a bracket support on the frame of the automobile directly adjacent the forward end of spring section 16; and such a bracket support for the exhaust pipe is indicated at 21 in Fig. 1.

Figure 2:
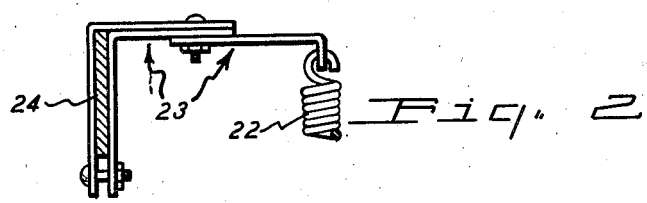
Fig. 2 is a detail section on line 2—2 of Fig. 1.

If it is desired to make the extension project a rather long distance behind the bumper and behind the rear end of the exhaust pipe, or if it is desired to make the closely coiled section exceptionally flexible under lateral thrust, the extension may be supported from the bumper by any suitable flexible support, as by a small wire or cable or spring. Such a flexible support is shown in Figs. 1 and 2 as a spring 22 hung from an adjustable bracket 23 mounted on the flat spring bracket 24 which supports the bumper. A small clamp or strap 22a connects the lower end of supporting spring 22 to the closely coiled section 15.

Figure 3:
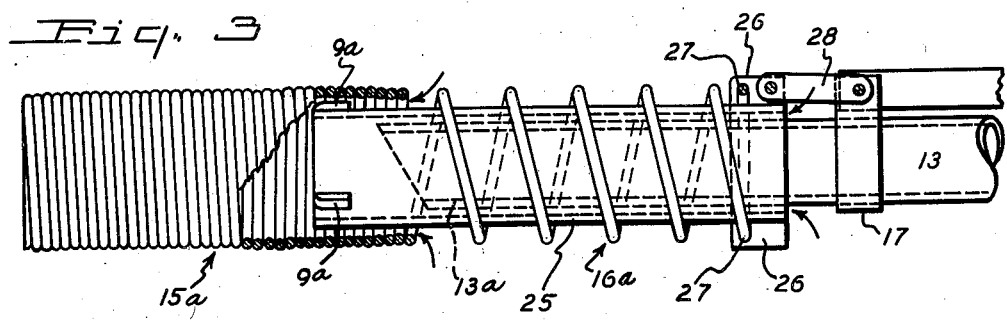
Fig. 3 is an enlarged side elevation and section showing the rear end of a typical exhaust pipe with another form of my invention applied thereto.

Fig. 3 shows a modification in which the spring sections 15a and 16a, instead of being directly mounted on the exhaust pipe as in Fig. 1, are mounted on a tube 25 which fits loosely over the end portion of the exhaust pipe, as illustrated. At its foremost end tube 25 has a series of circumferentially spaced lugs 26, provided with holes 27 through which the terminal convolution of the spring may be threaded, the terminal end being then bent to prevent unthreading. To one of these lugs an end of a securing strap or bar 28 may be secured, the other end being secured to a clamp 17 like that of Fig. 1.

When mounted and secured in the exhaust pipe, tube 25 is longitudinally fixed; and the spring sections 15a and 16a have the same movements with relation to it as they have with relation to the exhaust pipe proper in Fig. 1. Spacing lugs 9a for spring section 15a are here mounted on tube 25. The advantage of this form is that it requires no work to be done (e. g. welding on the lugs 9) on the exhaust pipe itself in applying my extension. Air will be drawn in through tube 25 as well as through spring section 15a to keep the parts from overheating.

Figure 4:
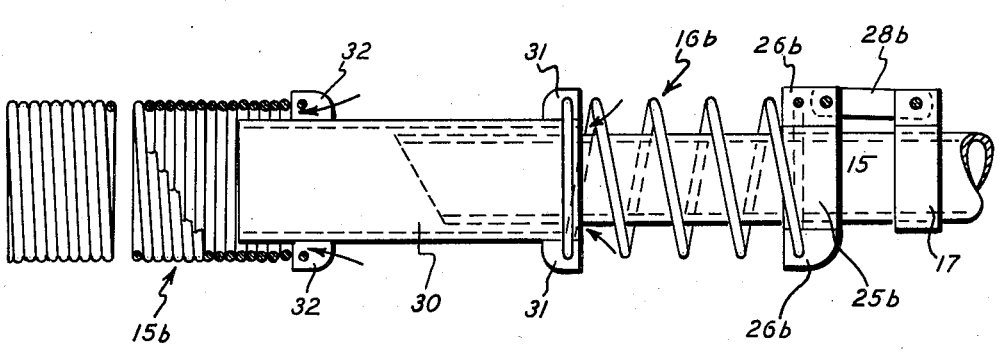
Fig. 4 is a similar view showing a further modification of my invention.

Fig. 4 shows a modification in which the two sections of the extension device are formed as physically separate pieces of helical spring and connected together by a slide tube 30 which, in its normal position, fits loosely and slidingly over the end of exhaust pipe 15. In this view the openly coiled section 16b is shown as attached at its forward end to the exhaust pipe in a manner similar to the attachment of spring section 16a to tube 25 in Fig. 3. Here in Fig. 4, a clamp or other tubular member 25b may carry the threading lugs 26b; and member 25b may be secured on the exhaust pipe by clamping or by use of a bar 28b to clamp 17 as in Fig. 3.

The rear end of open spring section 16b is connected to the forward end of slide tube 30 by threading through lugs 31 on that tube; and the forward end of closed spring section 15b is similarly attached to the rear end of tube 30 by threading lugs 32. When open section 16b is longitudinally compressed, tube 30 slides forwardly from its normal position shown in Fig. 4. Spring section 15b has an internal diameter larger than the external diameter of tube 30, allowing air to be drawn rearwardly between the tube and spring; and cooling air may also be drawn rearwardly between tube 30 and the exhaust pipe.

Figure 5:
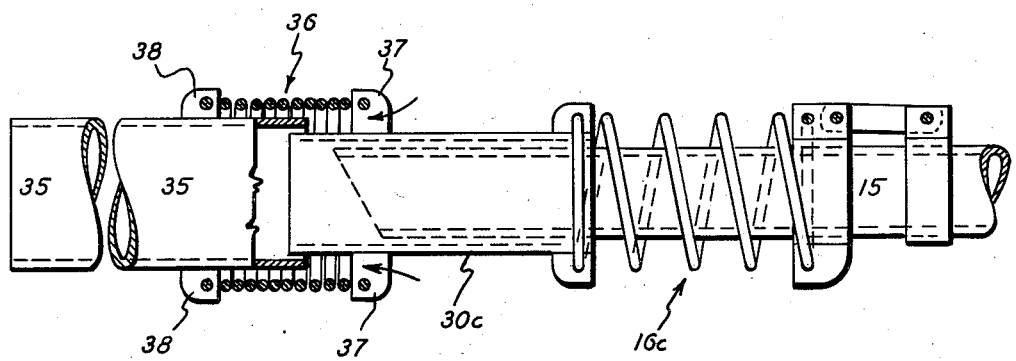
Fig. 5 is a similar view showing another modification.

Fig. 5 shows another modification in which the openly coiled spring section 16c is shown as connected at its forward end to the exhaust pipe in the same manner as in Fig. 4, and at its rear end to a slider tube 30c similar to Fig. 4. In this form of the device, the laterally flexible rearward section is composed of an extension tube 35 flexibly connected to slider tube 30c. The adjacent ends of the two tubes perferably overlap, with annular space between them for flexibility and for air entry. They are flexibly connected by a closely coiled short section of spring 36, joined to the two tubes by the threading lugs 37 and 38. The spring is larger than the larger tube 35, to allow air passage for cooling. The lateral flexibility of the spring allows the rearmost tube 35 to deflect laterally. And at the same time the rearward extension section which is made up of tube 35 and spring 36 is longitudinally incompressible, so that longitudinal thrust will slide tube 30c forwardly on the exhaust pipe, compressing the open spring section 16c.

Describing my extension device in a more general manner, it is made up of two sections or units, a forward section or unit and a rearward section or unit. The forward section, arranged upon the exhaust pipe forward of its rear end, is longitudinally compressible so as to allow the rearward section to move forwardly on the exhaust pipe upon which it is slidable. Typically this forward section is composed of a section of openly coiled spring slidingly surrounding the exhaust pipe and having its forward end fixed with relation to the pipe.

The rearward section, attached at its forward end to the rear end of the forward section, is made up of or contains a plurality of endwise abutting elements which are normally held in pre-compressed endwise abutting relation with each other by spring action so as to be laterally flexible. The forward end of this rearward section is slidable on the exhaust pipe. In the forms of Figs. 1 and 3, the whole of the rear section is composed of the closely coiled spring whose individual convolutions are held in pre-compressed endwise abutment. In the form of Figs. 4 and 5 the spring forms a part of the rear section, to give it lateral flexibility. In Fig. 4 the rearward section is composed of the slider tube 30 and the rearwardly extending spring 15b. In Fig. 5 the rearward section is composed of slider tube 30c, the rear tube 35 and the intermediate spring 36. In all of the forms the rearward section is longitudinally incompressible, slidingly fits over the exhaust pipe at its forward end, and has lateral flexibility. In Figs. 1 and 3 the rearward section is laterally flexible throughout its length. In Fig. 4 it is flexible through that portion of its length lying to the rear of the forward part 30 which slides on the exhaust pipe. In Fig. 5 its flexibility is in an intermediate part of its length at the rear of the forward slider tube 30c.

Described generally in another manner, my exhaust pipe extension is composed of a rear main section, of the longitudinally incompressible and laterally flexible nature which I have just described, together with a means (for instance the compressible forward section) for supporting the rear section upon the exhaust pipe so that the rear section may move forwardly upon the exhaust pipe against the resilient force of the supporting means.

I claim:

1. An extension for the exhaust pipe of an automobile, said extension comprising a tubular unit adapted at its forward end portion to fit telescopically on the rear end of the exhaust pipe, said unit being longitudinally incompressible and having lateral flexibility at least at a point in its length rearward of its forward end portion, and resilient means opposing forward sliding movement of said unit on the exhaust pipe, said means comprising a resiliently deformable element connected at one end to the forward end of the tubular unit, and means for anchoring the other end of the resilient element against movement in a direction longitudinally of the exhaust pipe, all so that the resilient element may deform resiliently to allow forward movement of the tubular unit on the exhaust pipe.

2. An exhaust pipe extension as specified in claim 1, and in which said tubular unit includes a series of annular elements arranged in endwise telescoping relation, and resilient means in association with said elements tending to urge them endwise yieldingly in a direction toward each other.

3. An exhaust pipe extension as specified in claim 1, and in which said tubular unit includes a tightly coiled helical spring, the coils of which are in mutual contact with each other.

4. An exhaust pipe extension as specified in claim 1, and in which said resilient means opposing forward movement of the tubular unit is composed of an openly coiled helical spring slidingly surrounding the exhaust pipe forward of the tubular unit and having its rear end connected with the tubular unit, and means holding the forward end of the openly coiled helical spring against movement longitudinally of the exhaust pipe.

5. An exhaust pipe extension as specified in claim 1, and in which said tubular unit includes a tightly coiled helical spring formed of a resilient rod, and in which said resilient means is composed of an open coil spring extending forwardly of the tubular unit and formed of the same length of rod, slidingly surrounding the exhaust pipe and having its forward end adapted to be connected thereto.

6. An exhaust pipe extension as specified in claim 1, and in which said tubular unit comprising a tightly coiled helical spring formed of a resilient rod, and in which said resilient means is composed of an open coil spring extending forwardly of the tubular unit and formed of the same length of rod, slidingly surrounding the exhaust pipe and having its forward end adapted to be connected thereto.

7. An exhaust pipe extension as specified in claim 1, and in which said tubular unit comprising a tightly coiled helical spring formed of a resilient rod, and in which said resilient means is composed of an open coil spring extending forwardly of the tubular unit and formed of the same length of rod, surrounding the exhaust pipe and having its forward end adapted to be connected thereto, both the open coiled and tightly coiled springs fitting loosely over the exhaust pipe, and spacing means on the pipe to annularly space the tightly coiled spring therefrom.

8. An extension for the exhaust pipe of an automobile comprising in combination a sleeve adapted to be fitted loosely over the rear end portion of the exhaust pipe, means for anchoring the sleeve to prevent longitudinal movement thereof relative to the exhaust pipe, a coiled spring element having a forward openly coiled section surrounding the sleeve and having its forward end secured to the sleeve, and having a rearward closely coiled section projecting rearwardly beyond the rear end of the sleeve.

9. Exhaust pipe extension as specified in claim 8, and in which the closely coiled section is of an internal diameter larger than the external diameter of the sleeve, and guiding means on the sleeve to space said section annularly about the sleeve.

10. An extension for the exhaust pipe of an automobile comprising in combination a sleeve adapted to slidingly fit over the rear end portion of the exhaust pipe, an open spiral spring surrounding the exhaust pipe forward of the sleeve and having its rear end attached to the sleeve and its forward end adapted to be attached to the exhaust pipe, and a longitudinally incompressible but laterally flexible tubular element attached to the rear end of the sleeve and extending rearwardly therefrom.

11. An extension for the exhaust pipe of an automobile comprising in combination a sleeve adapted to slidingly fit over the rear end portion of the exhaust pipe, an open spiral spring surrounding the exhaust pipe forward of the sleeve and having its rear end attached to the sleeve and its forward end adapted to be attached to the exhaust pipe, and a longitudinally incompressible but laterally flexible tubular element attached to the rear end of the sleeve and extending rearwardly therefrom, said last named element being composed of a tightly coiled helical spring.

12. An extension for the exhaust pipe of an automobile comprising in combination a sleeve adapted to slidingly fit over the rear end portion of the exhaust pipe, an open spiral spring surrounding the exhaust pipe forward of the sleeve and having its rear end attached to the sleeve and its forward end adapted to be attached to the exhaust pipe, and a longitudinally incompressible but laterally flexible tubular element attached to the rear end of the sleeve and extending rearwardly therefrom, said last named element being composed of an extension tube whose forward end fits loosely over the rear end of the first named tube, and flexible connection between the two tubes comprising a closely coiled helical spring spacedly surrounding both tubes and having its ends secured respectively to the two tubes.

13. An extension for the exhaust pipe of an automobile comprising in combination a sleeve adapted to slidingly fit over the rear end portion of the exhaust pipe, resilient means opposing forward sliding movement of the sleeve relative to the exhaust pipe, and a longitudinally incompressible but laterally flexible tubular element attached to the rear end of the sleeve and extending rearwardly therefrom.

14. An extension for the exhaust pipe of an automobile comprising in combination a sleeve adapted to slidingly fit over the rear end portion of the exhaust pipe, resilient means opposing forward sliding movement of the sleeve relative to the exhaust pipe, and a longitudinally incompressible but laterally flexible tubular element attached to the rear end of the sleeve and extending rearwardly therefrom, said last named element being composed of a tightly coiled helical spring.

15. An extension for the exhaust pipe of an automobile comprising in combination a sleeve adapted to slidingly fit over the rear end portion of the exhaust pipe, resilient means opposing forward sliding movement of the sleeve relative to the exhaust pipe, and a longitudinally incompressible but laterally flexible tubular element attached to the rear end of the sleeve and extending rearwardly therefrom, said last named element being composed of an extension tube whose forward end fits loosely over the rear end of the first named tube, and flexible connection between the two tubes comprising a closely coiled helical spring spacedly surrounding both tubes and having its ends secured respectively to the two tubes.

CARROLL W. CHESTER.

REFERENCES CITED

The following references are of record in the file of this patent:

UNITED STATES PATENTS

| Number | Name | Date |
|---|---|---|
| 1,480,208 | Houskeeper | Jan. 8, 1924 |
| 1,540,355 | Mathes | June 2, 1925 |
| 1,545,639 | Cohen | July 14, 1925 |

Certificate of Correction

Patent No. 2,489,480                                              November 29, 1949

CARROLL W. CHESTER

It is hereby certified that error appears in the printed specification of the above numbered patent requiring correction as follows:

Column 6, lines 24 and 25, for the word "comprising" read *includes*;

and that the said Letters Patent should be read with this correction therein that the same may conform to the record of the case in the Patent Office.

Signed and sealed this 21st day of March, A. D. 1950.

[SEAL]

THOMAS F. MURPHY,
*Assistant Commissioner of Patents.*